United States Patent
Shirakawa et al.

(10) Patent No.: US 9,200,145 B2
(45) Date of Patent: Dec. 1, 2015

(54) COUPLING AGENT FOR RUBBER/CARBON BLACK, AND RUBBER COMPOSITION CONTAINING SAME FOR USE IN TIRES

(75) Inventors: Yukiharu Shirakawa, Kagawa (JP); Takeshi Masuda, Kagawa (JP)

(73) Assignee: SHIKOKU CHEMICALS CORPORATION, Kagawa (JP)

( * ) Notice: Subject to any disclaimer, the term of this patent is extended or adjusted under 35 U.S.C. 154(b) by 143 days.

(21) Appl. No.: 14/234,218

(22) PCT Filed: Jul. 20, 2012

(86) PCT No.: PCT/JP2012/068513
§ 371 (c)(1),
(2), (4) Date: Jan. 22, 2014

(87) PCT Pub. No.: WO2013/015224
PCT Pub. Date: Jan. 31, 2013

(65) Prior Publication Data
US 2014/0155541 A1  Jun. 5, 2014

(30) Foreign Application Priority Data
Jul. 22, 2011 (JP) ................... 2011-160851

(51) Int. Cl.
*B60C 1/00* (2006.01)
*C08K 3/04* (2006.01)
*C08K 5/36* (2006.01)
*C08L 9/00* (2006.01)
*C08K 5/378* (2006.01)
*C08K 5/47* (2006.01)

(52) U.S. Cl.
CPC . *C08K 5/378* (2013.01); *B60C 1/00* (2013.01); *C08K 3/04* (2013.01); *C08K 5/47* (2013.01)

(58) Field of Classification Search
CPC ...... C07D 235/20; C07D 235/04; C08L 9/00; C08K 3/04; C08K 5/36
USPC ................. 548/305.4, 305.7, 304.4
See application file for complete search history.

(56) References Cited

FOREIGN PATENT DOCUMENTS

JP  9278942 A  10/1997
JP  2000239446 A  9/2000

OTHER PUBLICATIONS

S. T. Gunday et al., "Benzimidazole tethered proton conducting organic electrolytes", Materials Chemistry and Physics, 2007, vol. 105, issues 2-3, pp. 240-244.
International Search Report, dated for Aug. 14, 2012, issued by the International Searching Authority in counterpart International Application No. PCT/JP2012/068513.
Written Opinion, dated for Aug. 14, 2012, issued by the International Searching Authority in counterpart International Application No. PCT/JP2012/068513.
Communication issued on Mar. 20, 2015 in related European application No. 12817296.2.
Aghatabay et al., "Raman, FT-IR, NMR spectroscopic data and antimicrobial activity of bis[µ2-(benzimidazol-2-yl)-2-ethanethiolato-N,S,S-chloro-palladium(II)] dimer, [(µ2-CH$_2$CH$_2$NHNCC$_6$H$_4$)PdCl]$_2$*C$_2$H$_5$OH complex," European Journal of Medicinal Chemistry, 2007, 7 pages total, vol. 42 issue 8, Science Direct, www.elsevier.com/locate/ejmech.

*Primary Examiner* — Susannah Chung
*Assistant Examiner* — Josephine Chang
(74) *Attorney, Agent, or Firm* — Sughrue Mion, PLLC

(57) ABSTRACT

The present invention relates to a coupling agent for rubber/carbon black, containing a sulfide compound represented by the following chemical formula (I):

[Chem. 1]

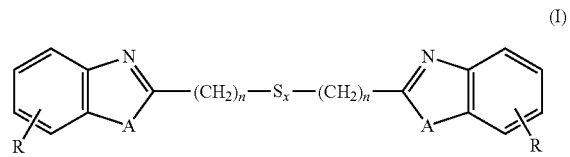

(in the formula, each A represents O, S, NH or NR; each R represents a linear or branched alkyl or alkenyl group having 1 to 6 carbon atoms, or a cyclic alkyl or alkenyl group having 3 to 6 carbon atoms, and when A is NR, the plurality of R's on a condensed aromatic heterocyclic ring may be the same as or different from each other; n represents an integer from 1 to 6; and x represents an integer from 1 to 4).

1 Claim, No Drawings

COUPLING AGENT FOR RUBBER/CARBON BLACK, AND RUBBER COMPOSITION CONTAINING SAME FOR USE IN TIRES

TECHNICAL FIELD

The present invention relates to a coupling agent for rubber/carbon black, and a rubber composition containing the same for use in tires.

BACKGROUND ART

As concern for the environment has been mounting in recent years, improvement in fuel economy for cars has been in increasing demand. Because the improvement in fuel economy of cars is influenced greatly by characteristics of tires, it has been desired to develop rubber compositions for use in tires satisfying such demand. On the other hand, grip on a wet road surface, that is, "wet grip", has also been regarded as important from the viewpoint of driving safety. Improvements in fuel economy characteristics require tires to be reduced in rolling resistance. However, reduction in rolling resistance results in lowering of wet grip.

As one of measures to develop tires having low rolling resistance while retaining adequate wet grip, studies have been pursued on coupling agents for rubber/carbon black which can allow not only improvement in dispersing capability of carbon black in a rubber composition as a raw material but also strengthening of chemical bonds between carbon black mixed as a rubber reinforcement and rubber molecules.

Many of what have been developed as coupling agents for rubber/carbon black are amino group-containing compounds. This is because the acid-base interaction between carbonyl and carboxyl groups present on the carbon black surface and the amino groups has been expected to produce a bonding effect.

For example, it has been reported in Patent Document 1 to utilize dialkylamino group-containing sulfur compounds as coupling agents for rubber/carbon black.

In addition, Patent Document 2 has reported the use of organic sulfide compounds having quaternary ammonium salt structure as coupling agents for rubber/carbon black, utilizing an action of an iminium ion group which is one of quaternary ammonium salts and is firmly bound to carbon black surface.

In each of these cases, however, the effect of lowering rolling resistance of tires obtained in vulcanization and molding steps has not yet reached to a level of satisfaction.

RELATED ART DOCUMENTS

Patent Literature

Patent Document 1: JP-A-H09-278942
Patent Document 2: JP-A-2000-239446

SUMMARY OF THE INVENTION

Problems to be Solved by the Invention

The invention aims to provide a novel coupling agent for rubber/carbon black, which is suitable as an ingredient in tires capable of delivering excellent wet grip performance and low-fuel consumption performance; and to provide a rubber composition for use in tires.

Means for Solving the Problems

As a result of intensive investigation for
The present inventors made intensive studies for solving the above-mentioned problem and, as a result, found that the desired object can be attained by using a sulfide compound represented by the chemical formula (I) described below as a coupling agent for rubber/carbon black, and they have accomplished the present invention.

That is, the first aspect of the present invention is a coupling agent for rubber/carbon black, containing a sulfide compound represented by the following chemical formula (I).

The second aspect of the present invention is a rubber composition containing a carbon black in a proportion of from 10 to 100 parts by weight to 100 parts by weight of a diene rubber and the coupling agent for rubber/carbon black of the first aspect in a proportion of from 1 to 30 parts by weight to 100 parts by weight of the carbon black.

[Chem. 1]

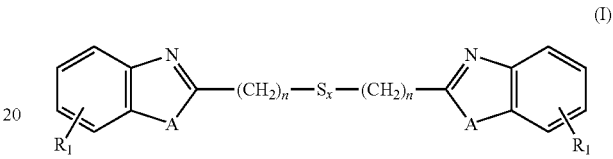

In the formula, each $R_1$ represents a hydrogen atom, a linear or branched alkyl or alkenyl group having 1 to 6 carbon atoms, or a cyclic alkyl or alkenyl group having 3 to 6 carbon atoms. Each A represents O, S, NH or $NR_2$. Each $R_2$ represents a linear or branched alkyl or alkenyl group having 1 to 6 carbon atoms, or a cyclic alkyl or alkenyl group having 3 to 6 carbon atoms. n represents an integer from 1 to 6 and x represents an integer from 1 to 4.

Advantage of the Invention

The sulfide compound incorporated into the coupling agent for rubber/carbon black of the present invention has condensed aromatic heterocyclic rings in its molecule, and it therefore forms bonding through the π-electron interaction with benzene rings on the carbon black surface in addition to the bonding through the acid-base interaction with carbon black surface.

Thus, the use of a rubber composition containing the coupling agent for rubber/carbon black of the present invention as a raw material of tires allows production of tires which have reduced rolling resistance while retaining their excellent wet grip, thereby delivering improved fuel economy performance.

MODE FOR CARRYING OUT THE INVENTION

The invention is described below in detail.
The sulfide compound incorporated into the coupling agent for rubber/carbon black of the present invention is represented by chemical formula (I) and has a symmetrical structure (bis-body structure) in which either end of the sulfide moiety is bound to a condensed aromatic heterocyclic ring via an alkylene group.

Examples of the compound include:
bis(benzimidazolyl-2)methyl sulfide,
2,2'-bis(benzimidazolyl-2)ethyl sulfide,
2,2'-bis(benzimidazolyl-2)ethyl disulfide,
2,2'-bis(benzimidazolyl-2)ethyl trisulfide,
2,2'-bis(benzimidazolyl-2)ethyl tetrasulfide,
3,3'-bis(benzimidazolyl-2)propyl disulfide,
3,3'-bis(benzimidazolyl-2)propyl trisulfide,
3,3'-bis(benzimidazolyl-2)propyl tetrasulfide,
4,4'-bis(benzimidazolyl-2)butyl disulfide,
4,4'-bis(benzimidazolyl-2)butyl trisulfide, 4,4'-bis(benzimidazolyl-2)butyl tetrasulfide,
5,5'-bis(benzimidazolyl-2)pentyl disulfide,
5,5'-bis(benzimidazolyl-2)pentyl trisulfide,
5,5'-bis(benzimidazolyl-2)pentyl tetrasulfide,
6,6'-bis(benzimidazolyl-2)hexyl disulfide,
6,6'-bis(benzimidazolyl-2)hexyl trisulfide,
6,6'-bis(benzimidazolyl-2)hexyl tetrasulfide,
2,2'-bis(1-methylbenzimidazolyl-2)ethyl disulfide,
2,2'-bis(4-methylbenzimidazolyl-2)ethyl disulfide,
2,2'-bis(5-methylbenzimidazolyl-2)ethyl disulfide,
3,3'-bis(1-methylbenzimidazolyl-2)propyl disulfide,
3,3'-bis(4-methylbenzimidazolyl-2)propyl disulfide,
3,3'-bis(5-methylbenzimidazolyl-2)propyl disulfide,
2,2'-bis(1-ethylbenzimidazolyl-2)ethyl disulfide,
2,2'-bis(4-ethylbenzimidazolyl-2)ethyl disulfide,
2,2'-bis(5-ethylbenzimidazolyl-2)ethyl disulfide,
3,3'-bis(1-ethylbenzimidazolyl-2)propyl disulfide,
3,3'-bis(4-ethylbenzimidazolyl-2)propyl disulfide,
3,3'-bis(5-ethylbenzimidazolyl-2)propyl disulfide,
3,3'-bis(1-n-propylbenzimidazolyl-2)propyl disulfide,
3,3'-bis(4-n-propylbenzimidazolyl-2)propyl disulfide,
3,3'-bis(5-n-propylbenzimidazolyl-2)propyl disulfide,
3,3'-bis(1-isopropylbenzimidazolyl-2)propyl disulfide,
3,3'-bis(4-isopropylbenzimidazolyl-2)propyl disulfide,
3,3'-bis(5-isopropylbenzimidazolyl-2)propyl disulfide,
3,3'-bis(1-tert-butylbenzimidazolyl-2)propyl disulfide,
3,3'-bis(4-tert-butylbenzimidazolyl-2)propyl disulfide,
3,3'-bis(5-tert-butylbenzimidazolyl-2)propyl disulfide,
2,2'-bis(benzoxazolyl-2)ethyl disulfide,
2,2'-bis(benzoxazolyl-2)ethyl trisulfide,
2,2'-bis(benzoxazolyl-2)ethyl tetrasulfide,
3,3'-bis(benzoxazolyl-2)propyl disulfide,
4,4'-bis(benzoxazolyl-2)butyl disulfide,
5,5'-bis(benzoxazolyl-2)pentyl disulfide,
6,6'-bis(benzoxazolyl-2)hexyl disulfide,
2,2'-bis(4-methylbenzoxazolyl-2)ethyl disulfide,
2,2'-bis(4-methylbenzoxazolyl-2)ethyl trisulfide,
2,2'-bis(4-methylbenzoxazolyl-2)ethyl tetrasulfide,
2,2'-bis(5-methylbenzoxazolyl-2)ethyl disulfide,
2,2'-bis(5-methylbenzoxazolyl-2)ethyl trisulfide,
2,2'-bis(5-methylbenzoxazolyl-2)ethyl tetrasulfide,
3,3'-bis(6-methylbenzoxazolyl-2)propyl disulfide,
3,3'-bis(6-methylbenzoxazolyl-2)propyl trisulfide,
3,3'-bis(6-methylbenzoxazolyl-2)propyl tetrasulfide,
2,2'-bis(benzothiazolyl-2)ethyl disulfide,
2,2'-bis(benzothiazolyl-2)ethyl trisulfide,
2,2'-bis(benzothiazolyl-2)ethyl tetrasulfide,
3,3'-bis(benzothiazolyl-2)propyl disulfide,
4,4'-bis(benzothiazolyl-2)butyl disulfide,
5,5'-bis(benzothiazolyl-2)pentyl disulfide,
6,6'-bis(benzothiazolyl-2)hexyl disulfide,
3,3'-bis(4-methylbenzothiazolyl-2)propyl disulfide,
3,3'-bis(4-methylbenzothiazolyl-2)propyl trisulfide,
3,3'-bis(4-methylbenzothiazolyl-2)propyl tetrasulfide,
3,3'-bis(5-ethylbenzothiazolyl-2)propyl disulfide,
3,3'-bis(5-ethylbenzothiazolyl-2)propyl trisulfide,
3,3'-bis(5-ethylbenzothiazolyl-2)propyl tetrasulfide,
3,3'-bis(6-n-propylbenzothiazolyl-2)propyl disulfide,
3,3'-bis(6-n-propylbenzothiazolyl-2)propyl trisulfide,
3,3'-bis(6-n-propylbenzothiazolyl-2)propyl tetrasulfide,
3,3'-bis(7-isopropylbenzothiazolyl-2)propyl disulfide,
3,3'-bis(7-isopropylbenzothiazolyl-2)propyl trisulfide and
3,3'-bis(7-isopropylbenzothiazolyl-2)propyl tetrasulfide.

Additionally, these sulfide compounds may be used alone or in the form of a mixture of two or more thereof as an ingredient of the coupling agent for rubber/carbon black.

The sulfide compound to be used in carrying out the present invention can be easily synthesized by making any of a 1,2-diaminobenzene compound, a 2-aminothiophenol compound and a 2-aminophenol compound react with a thiodicarboxylic acid compound in 4N dilute hydrochloric acid.

Examples of the 1,2-diaminobenzene compound include 1,2-diaminobenzene, 2,3-tolylenediamine, 1,2-diamino-3-ethylbenzene, 1,2-diamino-3-n-propylbenzene, 1,2-diamino-3-isopropylbenzene, and 1,2-diamino-3-n-butylbenzene.

Examples of the 2-aminothiophenol compound include 2-aminothiophenol, 2-amino-3-methylthiophenol, 2-amino-3-ethylthiophenol, 2-amino-3-n-propylthiophenol, 2-amino-4-methylthiophenol, 2-amino-4-ethylthiophenol, 2-amino-3-n-propylthiophenol, 2-amino-5-methylthiophenol, 2-amino-5-ethylthiophenol, 2-amino-5-n-propylthiophenol, 2-amino-6-methylthiophenol, 2-amino-6-ethylthiophenol, and 2-amino-6-n-propylthiophenol.

Examples of the 2-aminophenol compound include 2-aminophenol, 2-amino-3-methylphenol, 2-amino-3-ethylphenol, 2-amino-3-n-propylphenol, 2-amino-4-methylphenol, 2-amino-4-ethylphenol, 2-amino-4-n-propylphenol, 2-amino-5-methylphenol, 2-amino-5-ethylphenol, 2-amino-5-n-propylphenol, 2-amino-6-methylphenol, 2-amino-6-ethylphenol, and 2-amino-6-n-propylphenol.

Examples of a thiodicarboxylic acid compound include thiodiglycolic acid, dithiodiglycolic acid, trithiodiglycolic acid, tetrathiodiglycolic acid, thiodipropionic acid, dithiodipropionic acid, trithiodipropionic acid, tetrathiodipropionic acid, dithiodibutanoic acid, trithiodibutanoic acid, tetrathiodibutanoic acid, dithiodipentanoic acid, trithiodipentanoic acid, tetrathiodipentanoic acid, dithiodihexanoic acid, trithiodihexanoic acid, and tetrathiodihexanoic acid.

In the reaction of any of a 1,2-diaminobenzene compound, a 2-aminothiophenol compound and a 2-aminophenol compound with a thiodicarboxylic acid, there are no particular limitations to reaction time and reaction temperature, but the reaction temperature is preferably from 70 to 110° C. and more preferably from 90 to 105° C. The reaction time is preferably from 2 to 48 hours and more preferably from 6 to 24 hours.

The amount of 4N dilute hydrochloric acid is preferably in a range of 0.5 to 3 times by mole and more preferably in a range of 1.5 to 2.5 times by mole of the amount of a 1,2-diaminobenzene compound, a 2-aminothiophnol compound or 2-aminophenol compound used in the reaction.

The sulfide compound formed by the reaction is precipitated out by neutralizing hydrogen chloride in the reaction solution with ammonia water. Thereafter, the precipitate is obtained by filtration and washed with water, whereby the product is isolated and purified. There is no particular restriction on a solvent used in this washing so long as the product is hard to be dissolved therein. Examples thereof include water, methanol, ethanol, isopropyl alcohol, acetone, toluene, acetonitrile, and dioxane.

In the rubber composition of the present invention, it is appropriate that carbon black be blended in a proportion of from 10 to 100 parts by weight and more preferably from 30 to 80 parts by weight, to 100 parts by weight of a diene rubber. In the case where the blending amount of carbon black is lower than 10 parts by weight, there occurs reduction in abrasion resistance of rubber obtained in vulcanization and molding steps; whereas in the case where the blending amount is higher than 100 parts by weight, there occurs a viscosity increase in the rubber composition during a kneading operation prior to vulcanization, resulting in lowering of workability.

In the rubber composition of the present invention, it is appropriate that the coupling agent for rubber/carbon black of the present invention be blended in a proportion of from 1 to 30 parts by weight and more preferably from 2 to 20 parts by weight, to 100 parts by weight of carbon black. In the case where the blending amount of the coupling agent for rubber/carbon black is lower than 1 part by weight, the effect of lowering rolling resistance of tires obtained after vulcanization and molding steps cannot be achieved. On the other hand, it is uneconomical that the blending amount of coupling agent for rubber/carbon black is increased even beyond 30 parts by weight because the lowering effect has almost reached a ceiling and the amount of the agent used is increased in vain.

Any of diene rubbers currently used in the field of rubber industry can be used as a diene rubber to be blended in the rubber composition of the present invention without particular restrictions. Examples thereof suitably used herein include natural rubber (NR), isoprene rubber (IR), butadiene rubber (BR), styrene-butadiene rubber (SBR), acrylonitrile-butadiene rubber (NBR), butyl rubber (IIR), and chloroprene rubber (CR). These diene rubbers may be used alone or as combinations of two or more thereof.

As to carbon black to be blended in the rubber composition of the present invention, its nitrogen adsorption specific surface area determined (BET method) is preferably from 50 to 250 $m^2/g$ and more preferably from 70 to 230 $m^2/g$. In the case where the nitrogen adsorption specific surface area is less than 50 $m^2/g$, there may occur reduction in abrasion resistance of rubber obtained in vulcanization and molding steps; whereas, in the case where the nitrogen adsorption specific surface area is greater than 250 $m^2/g$, there may occur a viscosity increase in the rubber composition during a kneading operation prior to vulcanization, resulting in lowering of workability.

For the purpose of satisfactorily maintaining reinforcement and workability of the rubber composition, it is appropriate that the carbon black has a DBP oil absorption of from 60 to 150 ml/100 g and more preferably from 80 to 140 ml/100 g. In the case where the DBP oil absorption is less than 60 ml/100 g, there may occur reduction in reinforcement of the resulting rubber; whereas in the case where the DBP oil absorption is more than 150 ml/100 g, there may occur reduction in workability of the resulting rubber.

Examples of carbon black usable as the carbon black to be blended in the rubber composition of the present invention include furnace black, acetylene black, thermal black, and channel black. From the viewpoint of using it as an ingredient in tires, furnace black is preferably used.

As the furnace black, commercially available ones, such as Asahi #70, a product of ASAHI CARBON CO., LTD., and SEAST 3G, a product of Tokai Carbon Co., Ltd., can be used.

In the rubber composition of the present invention, it is appropriate that soluble sulfur or insoluble sulfur be blended as a vulcanizing agent in a proportion of from 0.5 to 10 parts by weight and more preferably from 2 to 5 parts by weight, to 100 parts by weight of a diene rubber.

In addition to the coupling agent for rubber/carbon black of the present invention, a diene rubber and carbon black, the rubber composition of the present invention can further contain general reinforcing agent and filler which have been traditionally used in rubber, such as silica, clay and talc. The blending proportion thereof can be chosen from a general range, preferably proportions ranging from 40 to 120 parts by weight to 100 parts by weight of a diene rubber.

In the rubber composition of the present invention, other additives including a vulcanization accelerator such as a sulfenamide, a vulcanization accelerating aid such as zinc oxide (zinc white) or magnesium oxide, a process oil such as naphthene oil or aroma oil, a dispersant (wax) such as stearic acid, an anti-aging agent, an antioxidant, an ozone crack inhibitor, a peptizer, a tacky resin, and a vulcanization retarder can be used so long as they cause no impairment in effects of the present invention.

The rubber composition of the present invention can be prepared by kneading the aforementioned ingredients with a kneading machine such as a Banbury mixer or an open roll. And then, the composition is vulcanized, and molded into rubber members for tires, such as carcasses, belts, beads, and treads.

EXAMPLES

The invention will now be illustrated in the concrete by reference to the following control experiments, examples and comparative examples, but the invention should not be construed as being limited to these examples in any way. Additionally, main ingredients used herein are as follows.

Ingredients
NR (SMR-CV60, a trade name, produced by Chong Hutton)
SBR (Nipol 1723, a trade name, produced by ZEON CORPORATION)
Carbon black (Asahi #70, a trade name, produced by ASAHI CARBON CO., LTD., BET specific surface area of 77 $m^2/g$ and DBP oil absorption of 101 ml/100 g)
Process oil (AROMAX 3, a trade name, produced by Idemitsu Kosan Co., Ltd.)
Stearic acid (MXST, a trade name, produced by MIYOSHI OIL & FAT CO., LTD.)
Zinc white (Zinc oxide II, a trade name, produced by SEIDO CHEMICAL INDUSTRY CO., LTD.)
Vulcanizing agent (Insoluble sulfur, Mu-cron OT20, a trade name, produced by SHIKOKU CHEMICALS CORPORATION)
Vulcanization accelerator (NOCCELER CZ-G, a trade name, produced by OUCHI SINKO CHEMICAL INDUSTRIAL CO., LTD.)
Anti-aging agent (NOCRACK 6C, a trade name, produced by OUCHI SINKO CHEMICAL INDUSTRIAL CO., LTD.)

Coupling agents for rubber/carbon black used in Examples are as follows, and their syntheses are shown in Reference examples 1 to 4. Additionally, these agents were synthesized in conformance with a publicly known method for synthesis of benzimidazole.

Coupling Agents for Rubber/Carbon Black in Examples
2,2'-Bis(benzimidazolyl-2)ethyl disulfide (which is abbreviated as "2EBZ")
2,2'-Bis(benzimidazolyl-2)ethyl tetrasulfide (which is abbreviated as "4EBZ")
2,2'-Bis(benzoxazolyl-2)ethyl disulfide (which is abbreviated as "2EBO")
2,2'-bis(benzothiazolyl-2)ethyl disulfide (which is abbreviated as "2EBT")

Reference Example 1

Synthesis of 2EBZ

Into a 3 L-flask were charged 1,250 ml (5 moles) of 4N hydrochloric acid, 260 g (2.4 moles) of 1,2-diaminobenzene and 252 g (1.2 moles) of 3,3-dithiodipropionic acid, and these ingredients were subjected to reaction under stirring for 12 hours at an internal temperature of 95° C. After the reaction solution was cooled to room temperature, thereto was added 700 ml of 25% ammonia water and stirring was continued for additional 2 hours under cooling with water. Precipitates formed in the reaction system were isolated, washed with water and dried, thereby obtaining 380 g (1.1 moles, a 89% yield) of the intended 2,2'-bis(benzimidazolyl-2)ethyl disulfide.

Reference Example 2

Synthesis of 4EBZ

Into a 3 L-flask were charged 1,250 ml (5 moles) of 4N hydrochloric acid, 260 g (2.4 moles) of 1,2-diaminobenzene and 329 g (1.2 moles) of 3,3-tetrathiodipropionic acid, and these ingredients were subjected to reaction under stirring for 18 hours at an internal temperature of 95° C. After the reaction solution was cooled to room temperature, thereto was added 700 ml of 25% ammonia water and stirring was continued for additional 2 hours under cooling with water. Precipitates formed in the reaction system were isolated, washed with water and dried, thereby obtaining 426 g (1.0 mole, a 85% yield) of the intended 2,2'-bis(benzimidazolyl-2)ethyl tetrasulfide.

Reference Example 3

Synthesis of 2EBO

Into a 3 L-flask were charged 1,250 ml (5 moles) of 4N hydrochloric acid, 262 g (2.4 moles) of 2-aminophenol and 329 g (1.2 moles) of 3,3-dithiodipropionic acid, and these ingredients were subjected to reaction under stirring for 24 hours at an internal temperature of 95° C. After the reaction solution was cooled to room temperature, thereto was added 700 ml of 25% ammonia water and stirring was continued for additional 2 hours under cooling with water. Precipitates formed in the reaction system were isolated, washed with water and dried, thereby obtaining 392 g (1.1 moles, a 92% yield) of the intended 2,2'-bis(benzoxazolyl-2)ethyl disulfide.

Reference Example 4

Synthesis of 2EBT

Into a 3 L-flask were charged 1,250 ml (5 moles) of 4N hydrochloric acid, 300 g (2.4 moles) of 2-aminothiophenol and 329 g (1.2 moles) of 3,3-dithiodipropionic acid, and these ingredients were subjected to reaction under stirring for 12 hours at an internal temperature of 95° C. After the reaction solution was cooled to room temperature, thereto was added 700 ml of 25% ammonia water and stirring was continued for additional 2 hours under cooling with water. Precipitates formed in the reaction system were isolated, washed with water and dried, thereby obtaining 400 g (1.0 mole, a 86% yield) of the intended 2,2'-bis(benzothiazolyl-2)ethyl disulfide.

Coupling agents for rubber/carbon black used in Comparative Examples are as follows.
Coupling Agents for Rubber/Carbon Black in Comparative Examples
Bis(dimethylaminoethyl)tetrasulfide (which is abbreviated as "DME", and disclosed in Patent Document 1)
Bis(dimethylaminopropyl)tetrasulfide (which is abbreviated as "DMP", and disclosed in Patent Document 1)
Bis(dimethylaminopyridinium hexylchloride)tetrasulfide (which is abbreviated as "DPH", and disclosed in Patent Document 2)

Each of these tetrasulfide compounds was synthesized by using the method described in Patent Document 1 or Patent Document 2.

Evaluation methods adopted in control experiments, Examples and Comparative Examples are as follows.
Tests Based on Internal Loss Measurements An unvulcanized rubber sheet was heated at 160° C. for 15 minutes in a mold measuring 200 mm by 200 mm by 2 mm, and thereby made into a vulcanized rubber sheet. From this vulcanized sheet were cut rectangular sample pieces each measuring 5 mm by 20 mm by 2 mm. Each of these sample pieces was set in a viscoelasticity spectrometer (Model Rheosol-G5000, made by UBM) with a gripper interval of 15 mm, and internal loss (Tan δ) of each sample piece was measured under conditions that torsional deformation of a dynamic strain of 5° was given to the sample piece at a frequency of 10 Hz at an ambient temperature of 0° C. or 60° C.

The internal loss at 0° C. [Tan δ (0° C.)] is an index of wet grip, and the greater the numerical value thereof, the greater the tire's wet grip is estimated.

The internal loss at 60° C. [Tan δ (60° C.)] is an index of rolling resistance, and the smaller the numerical value thereof, the lower the tire's rolling resistance and the better the fuel economy characteristic are estimated.

In Table 1, all test conclusions based on the internal loss measurements are shown as relative values, with each of the wet grip index and the rolling resistance index in Control Experiment 1 being taken as 100; while in Table 2, they all are shown as relative values, with each of the wet grip index and the rolling resistance index in Control Experiment 2 being taken as 100.

Control Experiment 1

A master batch was prepared by weighing out NR, carbon black, process oil, and stearic acid in their respective amounts corresponding to the composition shown in Table 1, and mixing them together with a Banbury mixer. Thereto, zinc white, a vulcanizing agent, a vulcanization accelerator, and an anti-aging agent were added in their respective amounts corresponding to the composition shown in Table 1. The resulting mixture was kneaded with a twin roll mixer having a surface temperature of 70° C., and therefrom was prepared an unvulcanized rubber composite formed into a sheet.

On the unvulcanized rubber composite thus prepared, the tests based on the internal loss measurements were carried out. The test results were as shown in Table 1.

Examples 1 to 6

Unvulcanized rubber composites having the compositions shown in Table 1 were formed into sheets, respectively, and on them each were carried out the tests based on the internal loss measurements in the same manner as in Control Experiment 1, except that the coupling agents for rubber/carbon black were further used in the composites, respectively. The test results were as shown in Table 1.

Comparative Examples 1 to 3

Other unvulcanized rubber composites having the compositions shown in Table 1 were formed into sheets, respectively, and on them each were carried out the tests based on the internal loss measurements in the same manner as in Examples 1 to 6. The test results were as shown in Table 1.

Control Experiment 2

An unvulcanized rubber composite having the composition shown in Table 2 was formed into a sheet, and thereon was carried out the tests based on the internal loss measurements in the same manner as in Control Experiment 1, except that SBR was used in place of NR. The test results were as shown in Table 2.

Examples 7 to 12

Unvulcanized rubber composites having the compositions shown in Table 2 were formed into sheets, respectively, and on them each were carried out the tests based on the internal loss measurements in the same manner as in Control Experiment 2, except that the coupling agents for rubber/carbon black were further used in the composites, respectively. The test results were as shown in Table 2.

Comparative Examples 4 to 6

Other unvulcanized rubber composites having the compositions shown in Table 2 were formed into sheets, respectively, and on them each were carried out the tests based on the internal loss measurements in the same manner as in Examples 7 to 12. The test results were as shown in Table 2.

TABLE 1

|  |  |  |  | Control Experiment | Example | | | | | | Comparative Example | | |
|---|---|---|---|---|---|---|---|---|---|---|---|---|---|
|  |  |  |  | 1 | 1 | 2 | 3 | 4 | 5 | 6 | 1 | 2 | 3 |
| Composition (parts by weight) | Master batch | NR |  |  |  |  |  | 100 |  |  |  |  |  |
|  |  | Carbon black |  |  |  |  |  | 45 |  |  |  |  |  |
|  |  | Process oil |  |  |  |  |  | 5 |  |  |  |  |  |
|  |  | Stearic acid |  |  |  |  |  | 3 |  |  |  |  |  |
|  |  | Coupling agent for rubber/carbon black | 2EBZ |  | 9 |  |  |  |  |  |  |  |  |
|  |  |  | 4EBZ |  |  | 9 |  |  | 5 | 3 |  |  |  |
|  |  |  | 2EBO |  |  |  | 9 |  |  |  |  |  |  |
|  |  |  | 2EBT |  |  |  |  | 9 |  |  |  |  |  |
|  |  |  | DME |  |  |  |  |  |  |  | 9 |  |  |
|  |  |  | DMP |  |  |  |  |  |  |  |  | 9 |  |
|  |  |  | DPH |  |  |  |  |  |  |  |  |  | 9 |
|  | Zinc white |  |  |  |  |  |  | 5 |  |  |  |  |  |
|  | Vulcanizing agent |  |  |  |  |  |  | 2 |  |  |  |  |  |
|  | Vulcanization accelerator |  |  |  |  |  |  | 1 |  |  |  |  |  |
|  | Anti-aging agent |  |  |  |  |  |  | 1 |  |  |  |  |  |
| Evaluation test | Tan δ (0° C.) Wet grip index |  |  | 100 | 103 | 101 | 104 | 101 | 100 | 101 | 103 | 101 | 105 |
|  | Tan δ (60° C.) Rolling resistance index |  |  | 100 | 66 | 62 | 64 | 60 | 64 | 68 | 90 | 85 | 81 |

TABLE 2

|  |  |  |  | Control Experiment | Example | | | | | | Comparative Example | | |
|---|---|---|---|---|---|---|---|---|---|---|---|---|---|
|  |  |  |  | 2 | 7 | 8 | 9 | 10 | 11 | 12 | 4 | 5 | 6 |
| Composition (parts by weight) | Master batch | SBR |  |  |  |  |  | 100 |  |  |  |  |  |
|  |  | Carbon black |  |  |  |  |  | 45 |  |  |  |  |  |
|  |  | Process oil |  |  |  |  |  | 5 |  |  |  |  |  |
|  |  | Stearic acid |  |  |  |  |  | 3 |  |  |  |  |  |
|  |  | Coupling agent for rubber/carbon black | 2EBZ |  | 7 |  |  |  |  |  |  |  |  |
|  |  |  | 4EBZ |  |  | 7 |  |  | 5 | 3 |  |  |  |
|  |  |  | 2EBO |  |  |  | 7 |  |  |  |  |  |  |
|  |  |  | 2EBT |  |  |  |  | 7 |  |  |  |  |  |
|  |  |  | DME |  |  |  |  |  |  |  | 7 |  |  |
|  |  |  | DMP |  |  |  |  |  |  |  |  | 7 |  |
|  |  |  | DPH |  |  |  |  |  |  |  |  |  | 7 |
|  | Zinc white |  |  |  |  |  |  | 5 |  |  |  |  |  |
|  | Vulcanizing agent |  |  |  |  |  |  | 2 |  |  |  |  |  |
|  | Vulcanization accelerator |  |  |  |  |  |  | 1 |  |  |  |  |  |
|  | Anti-aging agent |  |  |  |  |  |  | 1 |  |  |  |  |  |
| Evaluation test | Tan δ (0° C.) Wet grip index |  |  | 100 | 103 | 103 | 102 | 101 | 100 | 103 | 101 | 101 | 102 |
|  | Tan δ (60° C.) Rolling resistance index |  |  | 100 | 72 | 67 | 68 | 67 | 71 | 72 | 92 | 90 | 86 |

As can be seen from the test results shown in Table 1 and Table 2, the rubber compositions containing the coupling agents for rubber/carbon black of the present invention had dramatically improved rolling resistance while retaining comparable wet grip in contrast to the rubber compositions containing coupling agents for rubber/carbon black of the prior art.

While the present invention has been illustrated in detail and by reference to the specific embodiments thereof, it will be apparent to one skilled in the art that various changes and modifications can be made therein without departing from the spirit and scope of the invention.

This patent application is based on Japanese Patent Application No. 2011-160851 filed on Jul. 22, 2011, and the entire disclosure thereof is incorporated herein by reference, as if fully set forth herein.

INDUSTRIAL APPLICABILITY

As mentioned above, the present invention can provide tires ensuring good fuel economy, which have excellent wet grip performance and reduced rolling resistance.

The invention claimed is:

1. A rubber composition comprising a carbon black in a proportion of from 10 to 100 parts by weight to 100 parts by weight of a diene rubber and a rubber/carbon black coupling agent in a proportion of from 1 to 30 parts by weight to 100 parts by weight of the carbon black, wherein the coupling agent comprises a sulfide compound represented by formula (I):

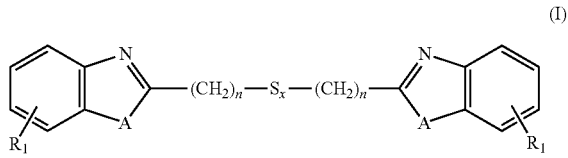

wherein each $R_1$ represents a hydrogen atom, a linear or branched alkyl or alkenyl group having 1 to 6 carbon atoms, or a cyclic alkyl or alkenyl group having 3 to 6 carbon atoms; each A represents NH; n represents an integer from 1 to 6; and x represents an integer from 1 to 4.

* * * * *